United States Patent [19]

Kobayashi et al.

[11] Patent Number: 4,718,014

[45] Date of Patent: Jan. 5, 1988

[54] APPARATUS FOR CONTROLLING IGNITION TIMING IN AN INTERNAL COMBUSTION ENGINE

[75] Inventors: Nobuyuki Kobayashi; Takashi Hattori; Kazuhiko Norota, all of Toyota, Japan

[73] Assignee: Toyota Jidosha Kabushiki Kaisha, Toyota, Japan

[21] Appl. No.: 729,853

[22] Filed: May 2, 1985

[30] Foreign Application Priority Data

May 7, 1984 [JP] Japan .................. 59-91594

[51] Int. Cl.⁴ .............................................. F02P 5/08
[52] U.S. Cl. ......................... 364/431.03; 123/416; 123/418; 74/852
[58] Field of Search .............. 364/431.03, 431.05; 123/416, 417, 418; 74/852, 858; 192/0.062

[56] References Cited

U.S. PATENT DOCUMENTS

| | | | |
|---|---|---|---|
| 4,232,642 | 11/1980 | Yamaguchi et al. | 123/416 |
| 4,266,447 | 5/1981 | Heess et al. | 74/852 |
| 4,436,072 | 3/1984 | Suzuki et al. | 123/418 |
| 4,498,438 | 2/1985 | Sato | 123/418 |
| 4,508,075 | 4/1985 | Takao et al. | 123/417 |
| 4,590,563 | 5/1986 | Matsumura et al. | 123/416 |

*Primary Examiner*—Parshotam S. Lall
*Attorney, Agent, or Firm*—Cushman, Darby & Cushman

[57] ABSTRACT

An ignition timing control apparatus for a spark ignition internal combustion engine for a vehicle having a manually operated transmission system. The apparatus includes an ignition control system for controlling ignition timing in such a manner that the timing is advanced when the engine speed drops due to engagement of the clutch of the transmission apparatus to begin the initial movement of the vehicle. The drop in the engine speed is sensed by detecting whether a second order difference value of the engine speed is lower than a reference value. This realizes quick control of the engine speed.

11 Claims, 20 Drawing Figures

APPARATUS FOR CONTROLLING IGNITION TIMING IN AN INTERNAL COMBUSTION ENGINE

BACKGROUND OF THE INVENTION

1. Field of the Invention

The present invention relates to an electronic ignition control system in an internal combustion engine for a vehicle. More particularly, it relates to an ignition control apparatus capable of preventing the rotational speed of the engine from dropping during initial movement. This facilitates initial movement of a vehicle that has a manual operated type transmission apparatus.

2. Description of the Related Art

In a vehicle provided with a manual type transmission apparatus, to begin vehicle movement, an acceleration pedal is steadily depressed to open the throttle valve from the idle position, in order to increase the rotational speed of the engine. At the same time, the clutch pedal is gradually engaged to begin to move the vehicle. If the clutch is too rapidly connected, it will cause a sudden drop in the rotational speed due to the load of the engine, generating a certain amount of shock, and preventing the vehicle from being easily moved from a standing position.

SUMMARY OF THE INVENTION

An object of the present invention is to provide a device capable of preventing a drop in the engine speed when the clutch device is engaged to move a vehicle from a standing position.

Another object of the present invention is to provide an apparatus for controlling the ignition timing, wherein the ignition timing is advanced to prevent the drop in an engine speed when the clutch device is engaged in order to move a vehicle.

According to the present invention, an apparatus is provided for controlling an ignition timing in a spark ignition internal combustion engine for a vehicle having a manually operated type transmission, which apparatus comprises a first detecting means for detecting engine speed; a first calculating means connected to the first detecting means for providing an electric signal related to a second order differential value of the engine speed sensed by the first detecting means, to detect any drop in the engine speed; second detecting means for detecting the initial movement of the vehicle; second calculating means for calculating a basic ignition timing determined by at least one engine operating condition; third calculating means for correcting the calculated basic ignition timing so that it has value advanced with respect to the basic value calculated by the second calculating means when the engine speed drops during the initial movement of the vehicle; and means for generating a spark arc at the calculated ignition timing.

DESCRIPTION OF THE PREFERRED EMBODIMENTS

Figure 1:
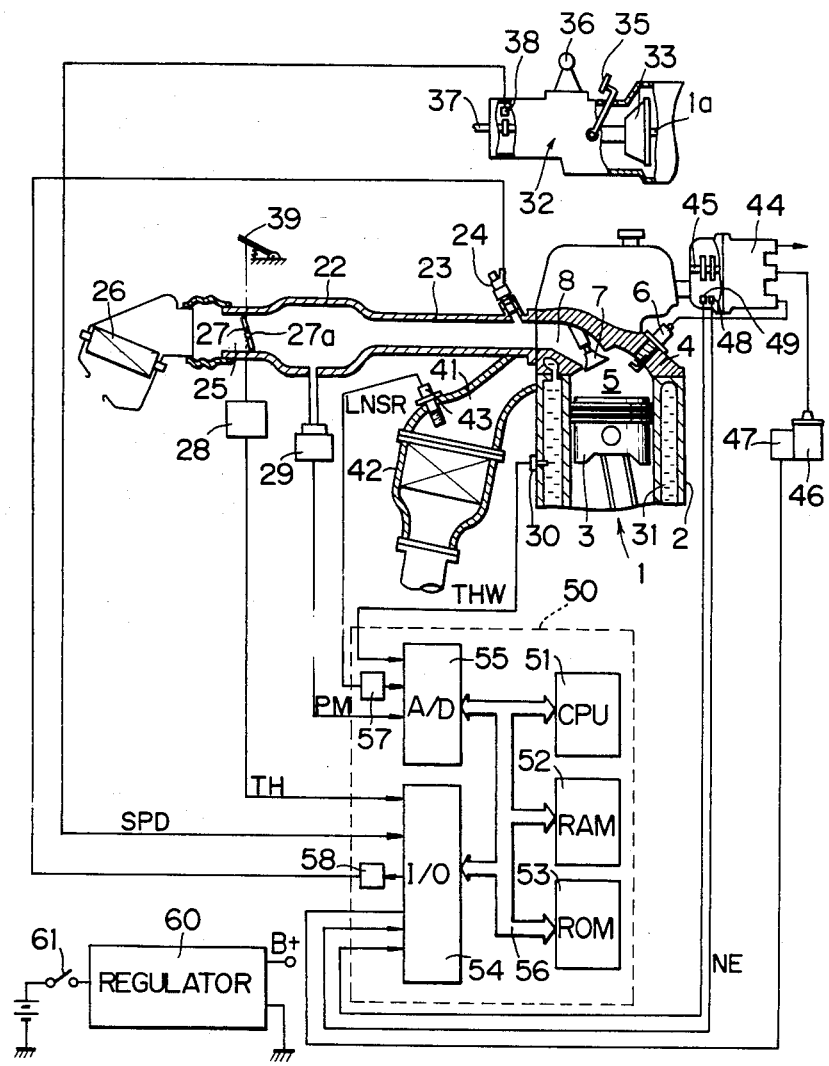
FIG. 1 is an overall view of an ignition control system according to the present invention.

Referring to FIG. 1, reference numeral 1 designates an engine body, 2 a cylinder block, 3 a piston reciprocally movable in the cylinder block 2, and 4 a cylinder head fixed to the cylinder block 2; 5 designates a combustion chamber, 6 a spark plug arranged in the combustion chamber 5, 7 an intake valve, and 8 an intake port. The intake port 8 is connected to a surge tank 22 via a branch pipe 23, and a fuel injector 24 is arranged in the branch pipe 23. This fuel injector 24 is connected to a fuel pump (not shown) driven by the engine. The surge tank 22 is connected to the outside air via an intake air duct 25 and an air filter element 26, and a throttle valve 27 actuated in response to depression of the accelerator pedal 39 is arranged in the intake air duct 26. A throttle switch 28 is connected to the valve shaft 27a of the throttle valve 27 in order to provide electric signals indicating the degree of opening TH of the throttle valve 27. The throttle switch 28 is connected to an electronic control unit 50.

A vacuum sensor 29 is attached to the surge tank 22 and produces an output voltage which is proportional to the absolute pressure produced in the surge tank 22. This vacuum sensor 29 is connected to the electronic control unit 50.

An exhaust manifold 41 is connected to the exhaust port (not shown) in the cylinder head 4, and a catalytic converter 42 containing a catalyzer therein is connected to the exhaust manifold 41. Hydrocarbons (HC), carbonmonoxide (CO), and nitrogen-oxides (NOx) are purified in the catalytic converter 42. A lean sensor 43 is arranged in the exhaust manifold 41 and connected to the electronic control unit 50. The lean sensor 43 produces an output current which is proportional to the oxygen concentration in the exhaust gas.

The engine 1 is equipped with a distributor 44 having a rotor 45 driven by the engine 1. The distributor 44 is connected to the electronic control unit 50 via an ignition coil 46 and an igniter 47. The electronic control unit 50 produces an ignition signal. This ignition signal is fed into the igniter 47, and then the primary current of the ignition coil 46 is controlled by that ignition signal. The high voltage produced in the ignition coil 46 is applied to the spark plug 6 of each cylinder via the distributor 44, and thus the spark plug 6 produces a spark at a time determined by the ignition signal. A pair of crank angle sensors 48, 49 are arranged in the distributor 44 and connected to the electronic control unit 50. The crank angle sensor 48 produces an output pulse every time the crankshaft of the engine 1 rotates by 30 degrees, and the crank angle sensor 49 produces an output pulse every time the crankshaft of the engine 1 rotates by 720 degrees.

A water temperature sensor 30 is arranged on the cylinder block 2 of the engine 1 to detect the temperature of the cooling water in a water jacket 31 in the cylinder block.

Reference numeral 32 denotes a manual operating type transmission having a clutch device 33 connected to a crankshaft 1a of the engine 1, a clutch pedal 35 for selectively engaging or disengaging the clutch device 33, a gear mechanism (not shown), a shift lever 36 operably connected to the gear mechanism, and an output shaft 37 for connecting the gear mechanism to a transmission shaft (not shown).

A vehicle speed sensor 38 is arranged in the transmission 32 for providing an output pulse every time the output shaft 37 rotates by a predetermined degree.

The electric control unit 50, to which power is supplied by a voltage regulator 60 operated by an ignition switch 61, is constructed as a digital computer and includes a central processing unit (CPU) 51 carrying out the arithmetic and logic processing, a random-access memory (RAM) 52, a read-only memory (ROM) 53 storing a predetermined control program and arithmetic constant therein, an input/output (I/O) port 54, and an analog-digital (A/D) converter 55 incorporating a multiplexer. The CPU 51, the RAM 52, the ROM 53, the I/O port 54, and the A/D converter 55 are interconnected to each other via a bidirectional bus 56. The throttle switch 28 is connected to the I/O port 54, and the output signal of the throttle switch 28 is input to the I/O port 54. The vacuum sensor 29 is connected to the A/D converter 55, and the output signal of the vacuum sensor 29 is input to the A/D converter 55. The temperature sensor 30 is connected to the A/D converter 55, and the output signal of the temperature sensor 30 is input to the A/D converter 55. The lean sensor 43 is connected to the A/D converter 55 via a current-voltage converting circuit 57 of the electronic control unit 50. The output current of the lean sensor 43 is converted to a corresponding voltage in the current-voltage converting circuit 57, and the voltage thus converted is input to the A/D converter 55. In the A/D converter 55, the output voltage of the vacuum sensor 29, the output voltage of the temperature sensor 30, or the output voltage of the current-voltage converting circuit 57 is selectively converted to a corresponding binary code in response to the indication signal issued from the CPU 51. The binary code thus obtained, that is, data representing the absolute pressure PM in the surge tank 22, data corresponding to the output current LNSR of the lean sensor 42, and data corresponding to the temperature THW of the cooling water, are stored in the RAM 52.

The crank angle sensors 48 and 49 are connected to the I/O port 54, and the output pulses of the crank angle sensors 48 and 49 are input to the I/O port 54. These output pulses are then input to the CPU 51 and, for example, the engine speed NE is calculated by measuring the number of output pulses which the crank angle sensor 48 produces per unit time. The engine speed NE thus calculated is stored in the RAM 52.

The vehicle speed sensor 38 in connected to the I/O port 54, and the output signal of the sensor 38 is input to the I/O port 54. The vehicle speed SPD is then calculated in a similar way by measuring the number of pulses from the sensor 38, and is stored in the RAM 52.

The fuel injector 24 is connected to the I/O port 54 via a drive circuit 58, and the igniter 47 is connected to the I/O port 54. An injection signal is fed into the fuel injector 24 from the CPU 51 via the I/O port 54 and the drive circuit 58. The solenoid of the fuel injector 24 is energized for the time period determined by the injection signal and thus fuel is intermittently injected from the fuel injector 24 into the intake port 8. As mentioned previously, the ignition signal is fed into the igniter 47 from the CPU 51 via the I/O port 54.

The control unit 50 is programmed to operate the fuel injectors in such a manner that the air-fuel ratio sensed by the lean sensor 43 coincides with the air-fuel ratio calculated from the sensed various operating conditions, such as the absolute pressure PM, engine speed NE, throttle opening TH, and engine cooling water temperature THW. The details of the control of the air-fuel ratio are not directly related to the present invention, and therefore, a description of the details of the program for controlling the injectors 24 is omitted.

The control unit 50 also is programmed to operate the ignition system in such a manner that the combustible mixture is ignited at a timing calculated by various operating conditions of the engine, such as the absolute pressure PM, engine speed NE, and engine cooling water temperature THW. In addition to this usual control of the ignition timing, the program also controls the ignition timing in such a manner that it is more advanced than the usual timing, to prevent a substantial drop in the engine speed even when the clutch device 33 is abruptly engaged to move the vehicle. The program for controlling the ignition timing will be fully described later with reference to the flow charts shown in FIGS. 2, 3, and 4.

Figure 5:
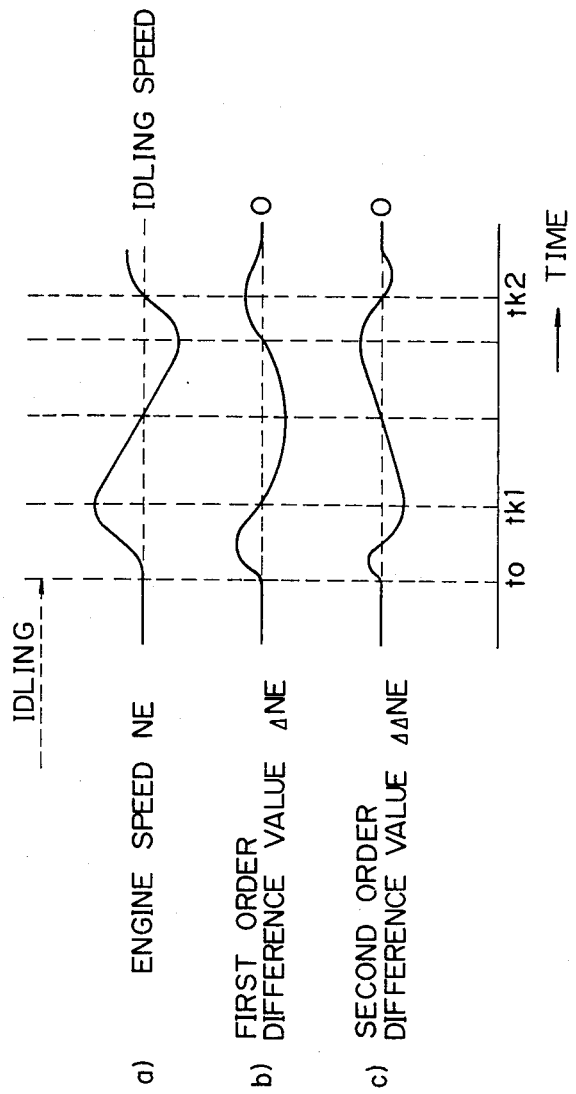
FIGS. 5a–5c show timing charts concerning engine speed, first order difference, and second order difference changes when a clutch mechanism is engaged in order to move a vehicle.

FIG. 5 is a schematic illustration of how a drop in the engine speed during the initial movement of the vehicle is detected as a result of the execution of the program. In FIG. 5, assume that, at time $t_0$, the accelerator pedal 39 is gradually depressed from an idle position while the clutch pedal 35 is fully depressed, so that the engine speed NE becomes higher than the idling speed as shown in (a). The first order difference value $\Delta$NE changes as shown in (b), and the second order difference value $\Delta\Delta$NE changes as shown in (c).

At the time tk1, the clutch pedal 35 is released to permit the clutch 33 to engage the transmission shaft with the engine 1. Since the load of the wheels of the vehicle is then transmitted to the engine 1, the engine speed NE begins to drop. At this time, when the engine speed begins to drop, the first order difference value $\Delta$NE attains a zero value. However, the second order difference value $\Delta\Delta$NE attains a zero value prior to the time tk1, and attains a minimum value at the time tk1. This means that a quicker detection of the drop in the engine speed NE due to the engagement of the clutch 33 is realized by detecting the second order difference value $\Delta\Delta$NE. According to the present invention, a drop in the engine speed NE is detected by comparing the detected second order difference $\Delta\Delta$NE with the reference value. When the drop in the engine speed is detected, the ignition timing is controlled to a value which is more advanced than the normal timing value.

In FIG. 5(a), at the time tk2, the engagement of the clutch 33 is completed, ending the drop in the engine speed NE, and the engine speed becomes higher.

Figure 2:
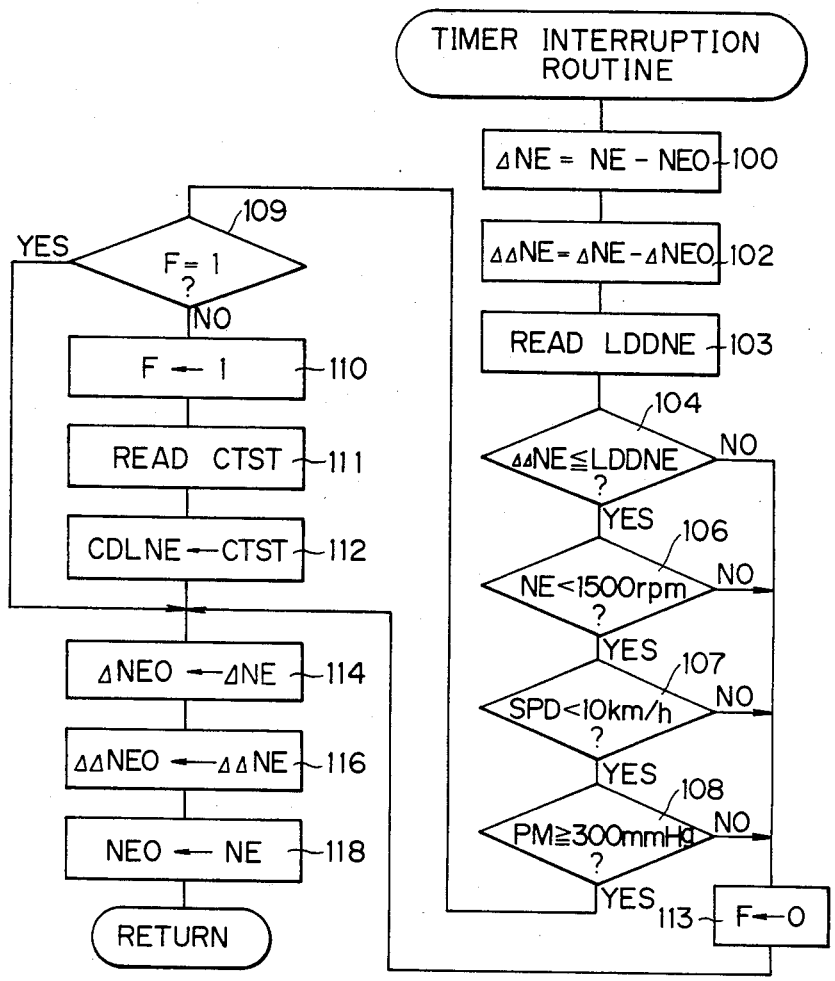
FIG. 2 is a flow chart for explaining a routine for calculating a second order difference of the engine speed.

Details of the above program will now be described with reference to the flow charts. FIG. 2 is a flow chart of a timer interruption routine, which is executed at predetermined periods, such as 32 msec. At point 100, the engine speed NE has the engine speed NE0, detected at the preceding cycle, substracted therefrom to obtain the first order difference value $\Delta NE$. At the next point 102, the obtained first order difference value $\Delta NE$ has subtracted therefrom the first order difference value $\Delta NE0$ obtained at the preceding cycle, to obtain the second order difference value $\Delta\Delta NE$. At point 103, a reference value LDDNE is read, which is to be compared with the actual second order difference value $\Delta\Delta NE$. In the first embodiment, LDDNE has a fixed value, such as $-50$ rpm. At point 104, it is determined whether the second order difference value $\Delta\Delta NE$ is lower than the predetermined value LDDNE ($-50$ rpm). When the value of the second order difference $\Delta\Delta NE$ is lower than $-50$ rpm, the program proceeds to point 106 to determine whether the vehicle is moving. When the second order difference value $\Delta\Delta NE$ is higher than $-50$ rpm, this means there is no significant drop in the rotational speed of the engine, and thus correction of the ignition timing is not necessary, so that the program then bypasses the routines 106 to 108. The second order difference value $\Delta\Delta NE$ obtained by second order differentiating the engine speed NE has, as shown in FIG. 5(c), a lowest value at the point tk1, where the engine speed NE begins to drop due to the beginning of the engagement of the clutch 33 with the transmission mechanism 32. By detecting that the value of the second order difference $\Delta\Delta NE$ is near the lowest value, the ignition timing control is effected at the earliest possible timing at which the engine speed NE begins to drop. In FIG. 6(a), the change in the second order difference value $\Delta\Delta NE$ at a region near its lowest value is shown on an enlarged scale.

At point 106 of FIG. 2, it is determined whether the engine speed NE is lower than the predetermined value, for example, 1500 rpm, which is much higher than a usual engine speed when the vehicle is moved. When the rotational speed of the engine is lower than 1500 rpm, the program proceeds to point 107, where it is determined whether the vehicle speed SPD sensed by the vehicle speed sensor 38 is slower than a predetermined low speed, such as 10 km/h. When the vehicle speed SPD is slower than 10 km/h, the program then proceeds to a point 108 where it is determined whether the intake pressure PM sensed by the pressure sensor 29 is higher than a predetermined value, such as 300 mmHg, which is higher than the minimum intake pressure attained at a deceleration condition of the engine. When the intake pressure PM is higher than 300 mmHg, this is taken as an indication that the vehicle is now moving, allowing the program to flow to a point 109 where it is determined whether flag F is 1. This flag F (FIG. 6(b)) indicates that the engine status has changed from that where no ignition timing correction is necessary to that where ignition timing correction is necessary. When the flag F=0, the program proceeds to point 110 to set flag F, and then to point 111 to read the data for a reference value CTST of a number of ignition operations to be corrected to attain a more advanced timing value. In this embodiment, CTST is fixed at a predetermined value, such as 3. At point 112, CTST is moved to a RAM area to store the read out ignition number reference value (3).

When any one of the requirements of the engine at the engine speed NE, vehicle speed SPD, and intake pressure PM at steps 106, 107, and 108, respectively, are not satisfied, then it is determined that the vehicle is not moving. Thus, after the flag F is reset at point 113, the program bypasses the steps 110-112 and flows directly to step 114.

At point 114, the content of a RAM area for storing the data of $\Delta NE$ is moved to a RAM area for storing the data of $\Delta NE0$, and $\Delta NE0$ is replaced by $\Delta NE$. In similar way, at point 116 $\Delta\Delta NE0$ is replaced by $\Delta\Delta NE$, and at point 118 NE0 is replaced by NE.

Figure 3:
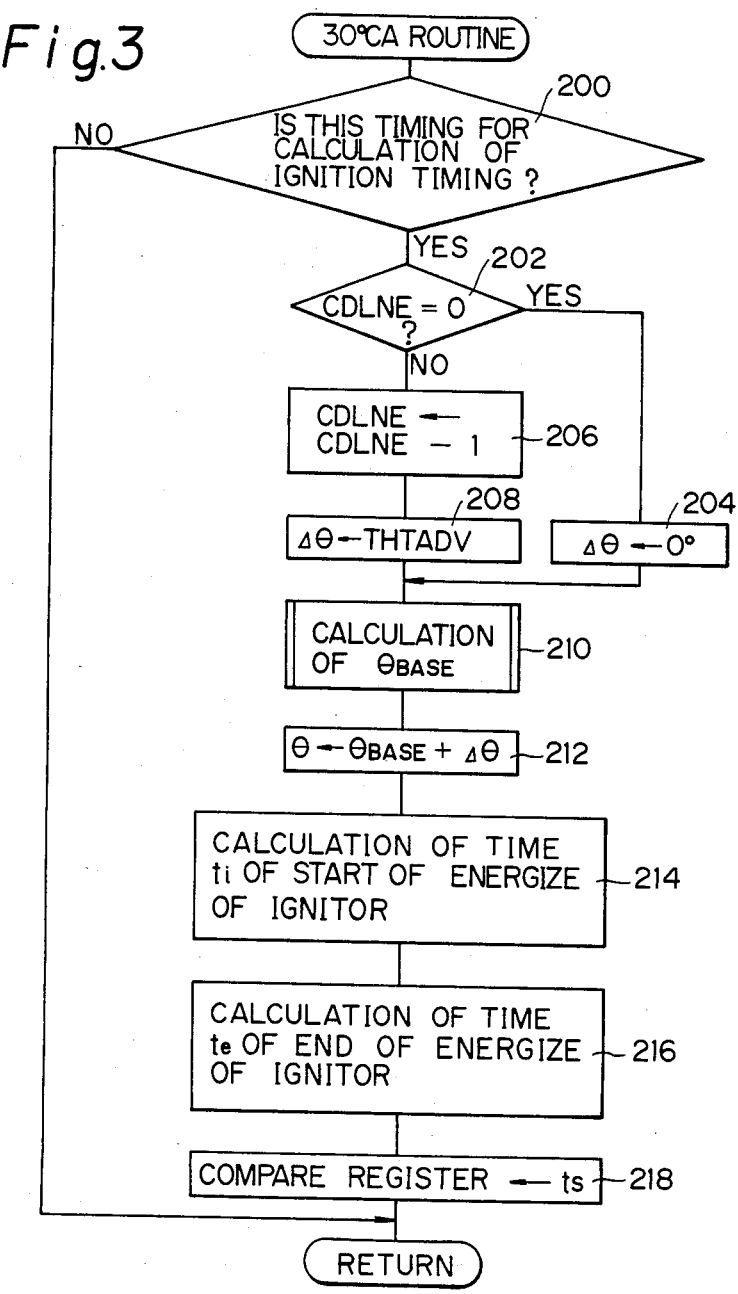
FIG. 3 is a flow chart for explaining a routine for calculating ignition timing.
Figure 6:
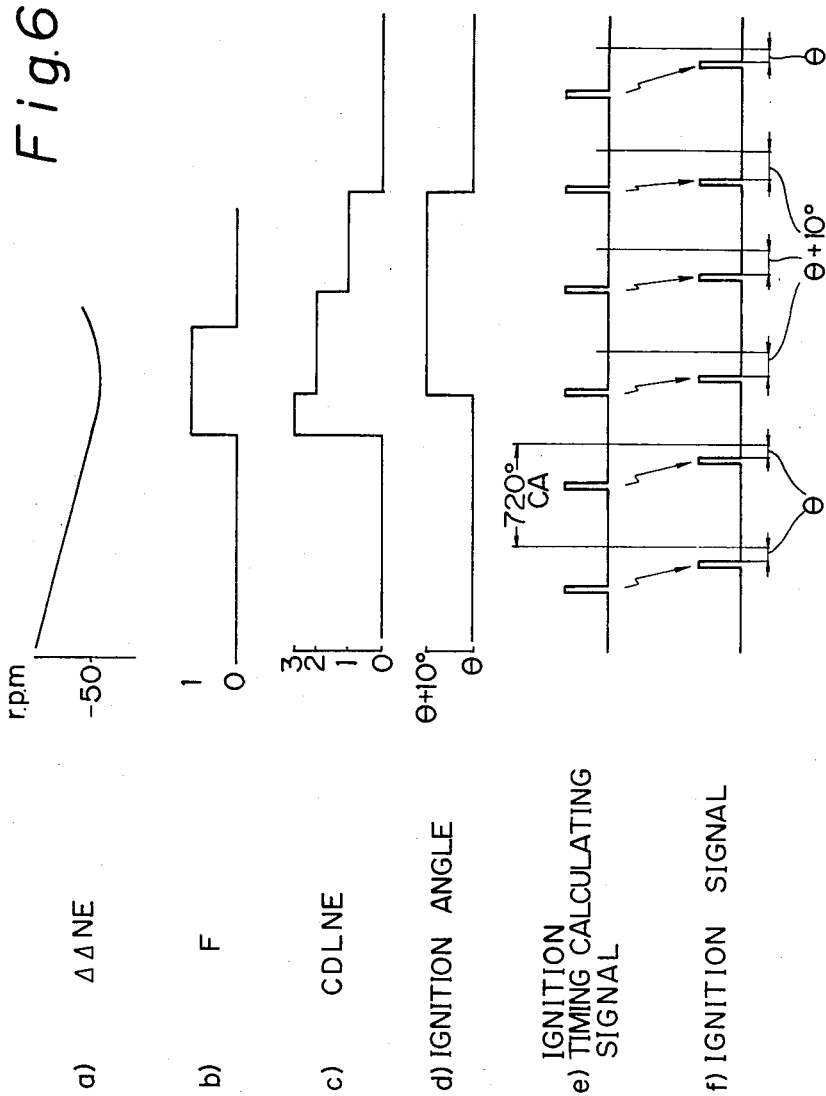
FIGS. 6a–6f show timing charts indicating the control of the ignition timing according to the present invention.
Figure 7:
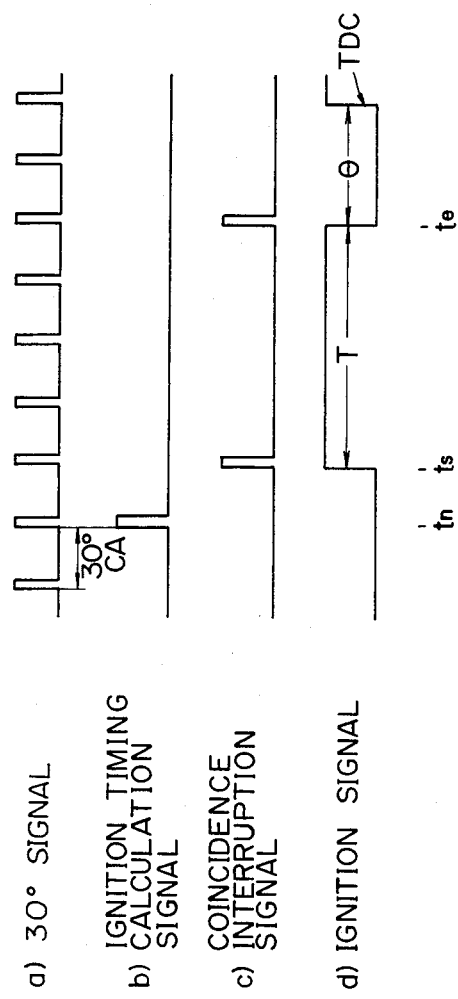
FIGS. 7a–7d show diagrams indicating how an ignition signal is obtained.

FIG. 3 shows a routine which is calculated at every 30° CA signal from the crank angle sensor 48, as shown in FIG. 7(a). At point 200, it is determined whether this timing is for calculation of the ignition timing. As is well known to those skilled in this art, calculation of the ignition timing is effected at a crank angle area before the piston reaches top dead center (TDC) in the compression stroke. The control unit 50 is provided with software (not shown) to issue a signal as shown in FIG. 7(b) indicating that the timing at which the ignition timing is to be calculated has just arrived by using a 720° CA signal from the crank angle sensor 49. The issuance of the ignition timing calculation signal causes the program to flow to point 202, where it is determined whether the value of the counter CDLNE, for counting the number of ignition operations with the corrected ignition timing value, is zero. When the value of the counter CDLNE is zero, the program proceeds to point 204 where the ignition timing correction value $\Delta\theta$ is cleared (0). When the value of the counter CDLNE is not zero, the program proceeds to point 206 where the counter CDLNE is decremented by 1 (FIG. 6(c)) and then to point 208 where the ignition correction value $\Delta\theta$ is calculated. In this embodiment, a fixed value, such as 10°, is stored in a RAM area, THTADV. The value 10° is moved to $\Delta\theta$. The value of $\Delta\theta$ is determined in such a manner that an increase in the engine speed is obtained that is sufficient to enable an easy initial movement of the vehicle.

At point 210 in FIG. 3, a base ignition timing $\theta_{BASE}$ is calculated. As is well known to those skilled in this art, the ROM 53 is provided with a map of the ignition timing values, each value being determined by a combination of engine conditions, such as the engine speed NE and intake pressure PM. The CPU 51 calculates a base ignition timing value from the map by a combination of the engine speed NE and pressure PM values actually sensed by the crank angle sensor 48 and the pressure sensor 29. At point 212, the base ignition timing $\theta_{BASE}$ calculated in step 210 is added to the ignition timing correction value $\Delta\theta$, which is moved to a RAM area for storing the data for the final ignition timing $\theta$. At points 214 and 216, the times of the starting $t_i$ and ending $t_e$ of the energization of the ignitor 47 are respectively calculated. As shown in FIG. 7(d), since the period T of the energization of the ignitor 47 for generating a spark in the spark electrodes is fixed, the times $t_i$ and $t_e$ can be calculated from the present time by using the engine speed NE in such a manner that the ignition signal becomes high at the time $t_i$ and, after the predetermined period T has lapsed, becomes low at the time $t_e$, which is spaced at the angle $\theta$ from the top dead center TDC, so that the spark is generated in the spark electrodes to ignite the combustible mixture. At a following point 218, the time $t_i$ is set to a comparator register provided in the CPU 51.

Figure 4:
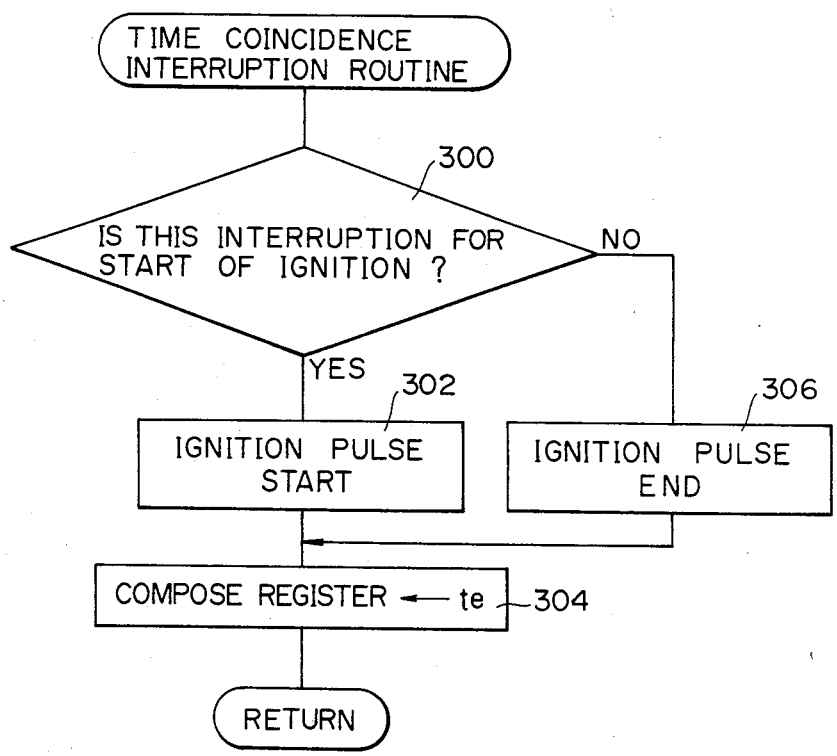
FIG. 4 is a flow chart for explaining a routine for generating an ignition signal.

When the present time coincides with the set time $t_i$, the comparator register issues a signal as shown in FIG. 7(c), which is supplied to an interruption requirement port in the CPU 51, so that the time coincidence interruption routine as shown in FIG. 4 is commenced. Since this interruption routine is for start of energization of the ignitor 47, the program proceeds from a point 300 to a point 302, where the output port issues a signal to energize the ignitor as shown in FIG. 7(d).

When the present time would correspond to the calculated time $t_e$, the comparator register issues a signal as shown in FIG. 7(c) to be supplied to the CPU 51 to start the time interruption routine as shown in FIG. 4. The program now proceeds via the point 300 to a point 306 where the ignition pulse signal supplied to the ignitor 47 becomes low level as shown in FIG. 7(d). As a result, a spark is generated in the spark electrodes of the spark plug 6 to start the ignition of the combustible mixture at the calculated angle $\theta$ from the top dead center (TDC).

FIG. 6 illustrates how the ignition control operation is carried out in accordance with the above mentioned program. When the second order difference $\Delta\Delta NE$ becomes smaller than $-50$ rpm, (a), the flag F is set (b) and counter CDLNE is set to 3(c). The counter CDLNE is decremented by 1 each time the ignition timing calculating signal is issued, which signal is issued for every 720° crank angle for every cylinder (1 cycle of the engine) as shown in FIG. 6(e). When the value of the counter CDLNE is higher than 1, the final ignition timing $\theta$ is advance by an angle of 10°, as shown in FIG. 6(f), in comparison with the ignition timing before or after correction is effected. This correction of the ignition timing toward the advanced side when the engine speed NE begins to drop because of the engagement of the clutch apparatus 33, causes an increase in the engine torque to compensate for this drop in the engine speed NE. As a result, the drop in the engine speed NE when the clutch apparatus 33 is engaged is controlled so as to ease any shock to the engine, and to permit a smooth initial movement of the vehicle.

Figure 8:
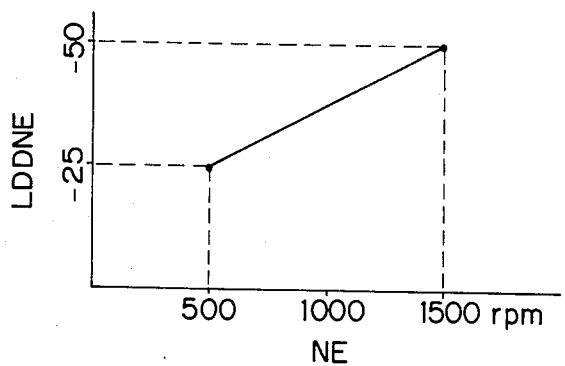
FIG. 8 shows a relationship between the engine speed and a reference value of a second order difference to be compared with the sensed second order engine speed difference.

In the embodiment, the reference value LDDNE to be compared with the second order difference $\Delta\Delta NE$ is, at the point 104 in FIG. 2, a fixed value such as $-50$ rpm. As a modification, the reference value LDDNE can be calculated from a map of reference values made from various values of the engine speed NE as a parameter. FIG. 8 is an example of a relationship between the NE and LDDNE. The map corresponding to FIG. 8 is stored in a predetermined area of the ROM 53. At a step corresponding to step 103 in FIG. 2, the reference value LDDNE corresponding to the sensed NE would be calculated from the map in FIG. 8.

Figure 9:
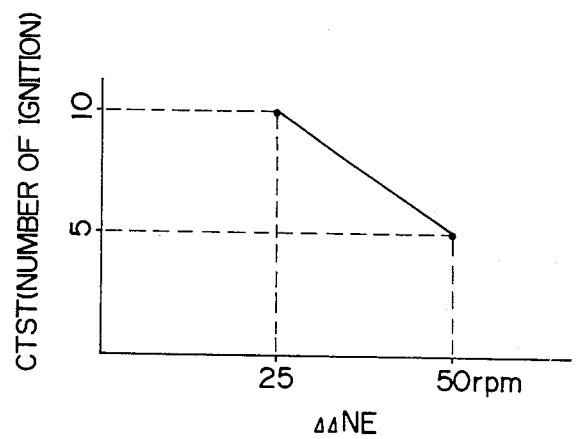
FIG. 9 shows a relationship between the second order difference value and the number of ignition operations of the corrected ignition timing.

In the embodiment in FIG. 2, the number of ignition operations CTST of the corrected ignition timing value at step 111 is fixed at a predetermined value such as 3. As a modification, the reference value CTST can be calculated from a map of a various number of ignition operations with respect to the second order difference value $\Delta\Delta NE$ as shown in FIG. 9. The map corresponding to FIG. 9 is stored in a predetermined area of the ROM 53. At a step corresponding to step 111, the reference value CTST corresponding to the second order difference value $\Delta\Delta NE$ calculated at a step corresponding to step 102 would be calculated from the map in FIG. 9.

Figure 10:
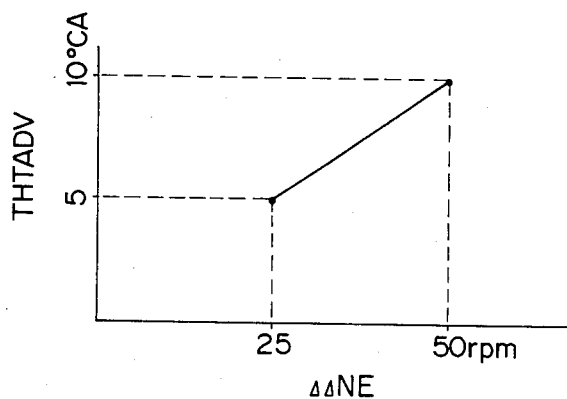
FIG. 10 shows a relationship between the second order difference value and the correction value of the ignition timing.

In the embodiment in FIG. 3, the correction value THTADV of the ignition timing $\Delta v$ added to the base ignition timing $\theta_{BASE}$ at the drop in engine speed during the initial movement of the vehicle, at step 208, is fixed at a predetermined value such as 10 degrees. As a modification, the correction value THTADV can be calculated from a map of various values of THTADV with respect to the second difference value $\Delta\Delta NE$ as shown in FIG. 10. The map corresponding to FIG. 10 is stored in a predetermined area of the ROM 53. At a step corresponding to step 102 in FIG. 2 and 208 of FIG. 3, the THTADV corresponding to the second order difference value $\Delta\Delta NE$ calculated at step 102 of FIG. 2 would be calculated from the map in FIG. 10.

While the present invention is described with reference to the embodiments, many modifications and changes may be made by those skilled in this art without departing from the scope of the invention.

What is claimed is:

1. An apparatus for controlling an ignition timing in a spark ignition internal combustion engine for a vehicle having a manually operated type transmission device, speed apparatus comprising:

first detecting means for detecting an engine speed;

first calculating means, connected to said first detecting means, for calculating a second order differentiation on said engine speed sensed by the first detecting means, to detect a reduction in said engine speed;

second detecting means for detecting an initial movement of the vehicle;

second calculating means for calculating a basic ignition timing in accordance with at least one engine operating condition;

gate means for issuing a signal which is indicative of a rapid engagement of said manually operated transmission device, upon a detection of said reduction in engine speed and a detection of said initial movement of the vehicle;

correction means responsive to said signal from said gate means for correcting said basic ignition timing calculated by the second calculating means to obtain an advanced ignition timing value which is advanced with respect to said basic ignition timing to increase engine torque under such conditions and enable a smooth initial movement of the vehicle; and means for generating a spark arc at the calculated ignition timing in order to cause the ignition to take place at the proper timing.

2. An apparatus according to claim 1, wherein said second detecting means comprises first means for determining whether said engine speed is lower than a first predetermined value, second means for detecting whether a vehicle speed is lower than a second predetermined value, and third means for detecting whether an absolute intake pressure is higher than a third predetermined value.

3. An apparatus according to claim 1, wherein said first calculating means comprises means for calculating a difference over the engine speed in a predetermined period, and means for calculating a difference in said engine speed difference over a predetermined period.

4. An apparatus according to claim 3, wherein said first calculating means comprises means for calculating a reference value of said second order engine speed difference, and means for comparing said calculated second order engine speed reference value with said calculated second order engine speed difference.

5. An apparatus according to claim 4, wherein said reference value of the second order engine speed difference is fixed.

6. An apparatus according to claim 4, wherein said reference value of the second order engine speed difference is varied in accordance with the engine speed.

7. An apparatus according to claim 1, wherein said correction means comprises means for counting a number of ignition operations at the corrected ignition timing, means for comparing the counted number of ignition operations with a predetermined reference number and means for calculating a correction timing value, indicative of a correction to be performed to ignition timing, to be added to the basic ignition timing until the counted number reaches the reference number.

8. An apparatus according to claim 7, wherein said reference number is fixed.

9. An apparatus according to claim 7, wherein said reference number is varied in accordance with the second order engine speed difference value.

10. An apparatus according to claim 7, wherein said correction timing value is fixed.

11. An apparatus according to claim 7, wherein said correction timing value is varied in accordance with the second order engine speed difference value.

* * * * *